(12) United States Patent
Lundgren

(10) Patent No.: US 6,625,924 B2
(45) Date of Patent: Sep. 30, 2003

(54) GARDEN ENCLOSURE KIT

(76) Inventor: Sharon Lundgren, 772 Console Avenue, Winnipeg, Manitoba (CA), R2K 1T2

( * ) Notice: Subject to any disclaimer, the term of this patent is extended or adjusted under 35 U.S.C. 154(b) by 0 days.

(21) Appl. No.: 09/983,433

(22) Filed: Oct. 24, 2001

(65) Prior Publication Data

US 2002/0046484 A1 Apr. 25, 2002

Related U.S. Application Data

(60) Provisional application No. 60/242,719, filed on Oct. 25, 2000.

(51) Int. Cl.$^7$ ............................ A01G 13/02; A01G 9/14
(52) U.S. Cl. ........................................ 47/29.6; 135/903
(58) Field of Search ................ 47/19.2, 22.1, 47/23.3, 29.6; 135/115, 903

(56) References Cited

U.S. PATENT DOCUMENTS

| | | | |
|---|---|---|---|
| 1,125,378 A | * | 1/1915 | Nichols |
| 1,719,055 A | * | 7/1929 | Herzer ..................... 135/88.13 |
| 1,904,700 A | * | 4/1933 | Starks |
| 2,014,175 A | * | 9/1935 | Hart |
| 2,251,624 A | * | 8/1941 | Foree et al. |
| 2,967,532 A | * | 1/1961 | Burgin ........................ 135/151 |
| 3,581,436 A | | 6/1971 | Basiger |
| 4,296,568 A | | 10/1981 | Dukes |
| 5,265,373 A | | 11/1993 | Vollebregt |
| 5,437,298 A | | 8/1995 | Lin |
| 5,451,445 A | | 9/1995 | Wang |
| 5,832,660 A | * | 11/1998 | Posa ........................... 47/20.1 |
| 5,992,088 A | | 11/1999 | Henningsson et al. |
| 2002/0046484 A1 | * | 4/2002 | Lundgren ................... 47/29.6 |

FOREIGN PATENT DOCUMENTS

| | | | |
|---|---|---|---|
| GB | 2251777 A | * | 1/1991 |
| JP | 6-141690 | * | 5/1994 |
| JP | 6-343355 | * | 12/1994 |
| JP | 9-154421 | * | 6/1997 |
| JP | 2000-69862 | * | 3/2000 |
| JP | 2000-116254 | * | 4/2000 |

* cited by examiner

*Primary Examiner*—Peter M. Poon
*Assistant Examiner*—Jeffrey L. Gellner
(74) *Attorney, Agent, or Firm*—Ryan W. Dupuis; Adrian D. Battison; Michael R. Williams

(57) ABSTRACT

A garden enclosure kit is provided for protecting a planted area from frost and the like. The kit includes a frame structure arranged to be supported on the ground about the planted area. Sheeted material is supported on a roller arranged to be selectively coupled to the frame structure to define an enclosure. The sheeted material includes an elongate main sheet having a coupled end coupled to the roller and a free end arranged to be coupled to the frame structure spaced from the roller for defining a cover extending over the planted area. The sheeted material also includes a plurality of side sheets formed integrally with the main sheet which are arranged to be suspended from respective sides of the main sheet in an extended position of the sheeted material for enclosing the planted area. When the use of the enclosure is no longer required, the side sheets are folded across the main sheet so that the sheeted material may be rolled onto the roller.

18 Claims, 5 Drawing Sheets

GARDEN ENCLOSURE KIT

This application claims the benefit of provisional application Ser. No. 60/242,714 filed Oct. 25, 2000.

FIELD OF THE INVENTION

This invention relates to a kit for enclosing a small planted area including gardens and the like for protection against the surrounding climate including frost and the like.

BACKGROUND

Climatic conditions including frost, heavy rain and hail are known to damage garden plants including flowered plants and vegetable or fruit bearing plants. It is thus desirable to protect these types of plants by surrounding the plants individually or an entire planted area using sheets of material formed of plastic or cloth materials. Typically the process of covering plants involves an awkward manipulation of stakes to be planted into the ground and sheet of material such as bed sheets and the like which must be tied down over the plants and the stakes to form an enclosure about the plants.

Various covers are described in the following U.S. Pat. No. 5,265,373 to Vollebregt, U.S. Pat. No. 5,992,088 to Henningsson et al, U.S. Pat. No. 5,451,554 to Wang, U.S. Pat. No. 5,083,396 to Traut, U.S. Pat. No. 3,581,436 to Basiger, U.S. Pat. No. 5,437,298 to Lin and U.S. Pat. No. 4,296,568 to Dukes. None of these covers however are suitably arranged to readily enclose a small planted area for effective protection against frost and the like.

SUMMARY

According to the present invention there is provided a garden enclosure kit for protecting a planted area from a surrounding climate, the kit comprising:

a frame structure arranged to be supported on the ground adjacent the planted area;

a roller arranged to be selectively coupled to the frame structure for rotation about an axis of the roller;

an elongate main sheet arranged to extend in a longitudinal direction of the main sheet from a coupled end to a free end of the main sheet;

the coupled end of the main sheet being arranged to be coupled to the roller for rolling the main sheet onto the roller in a stored position;

the free end of the main sheet being arranged to be selectively coupled to the frame structure at a location spaced from the roller in an extended position for defining a cover extending over the planted area between the roller and the free end of the main sheet; and a plurality of side sheets arranged to be suspended from respective sides of the main sheet in the extended position for defining an enclosure over the planted area.

The main sheet and the side sheets suspended therefrom are arranged to fully enclose a planted area for protecting gardens and the like from frost and other damaging weather. The use of side sheets are particularly useful when protecting small gardens as the use of only a cover in such instances does not provide sufficient protection from frost by itself. The further arrangement wherein the roller housing and sheet are only selectively coupled to frame structure permit the roller housing and sheet to be readily removed or installed while the frame structure may remain planted in the ground.

The main sheet preferably spans laterally between respective first and second sides thereof and the side sheets preferably comprise first and second side sheets coupled to the respective first and second sides of the main sheet. The first and second side sheets may be foldable relative to the main sheet between a folded position in which the side sheets extend laterally inwardly from the respective sides of the main sheet substantially parallel and adjacent to the main sheet and an extended position in which the side sheets are suspended from the sides of the main sheet for defining respective sides of the enclosure extending over the planted area when the roller and the free end of the main sheet are supported on the frame structure.

There may be provided a plurality of slots in the respective side sheets extending laterally outward at longitudinally spaced position therealong. The side sheets preferably extend laterally outward a distance approximately equal to a width of the main sheet.

The main sheet and the side sheets are preferably formed of a pliable weather resistant material. This may include a substantially waterproof material.

The roller preferably includes a biasing mechanism for urging the main sheet into a rolled position about the roller.

There may be provided an extension sheet extending longitudinally outward from the free end of the main sheet a distance approximately equal to a length of the side sheets. When there is provided a roller housing mounting the roller therein, an extension sheet may be mounted on the roller housing to extended outwardly therefrom a distance approximately equal to a length of the side sheets. The extension sheets are useful for providing ends to the enclosure over the planted area.

There may be provided a plurality of apertures in respective free ends of the side sheets for securing the side sheets adjacent the ground in the extended position.

There may be provided a plurality of ground penetrating stakes having respective retainer portions arranged to secure the respective side sheets adjacent the ground in the extended position.

There may be provided a plurality of fasteners secured to the respective free ends of the side sheets for securing the side sheets in the extended position.

The frame structure is preferably adjustable in height.

The frame may comprise a pair of spaced apart end support elements arranged to support the main sheet spanning therebetween. There may be provided any number of intermediate support elements at spaced apart locations between the end support elements as required to support the main sheet spanning therebetween.

Each support element may include a stabiliser element coupled thereto for engaging the ground adjacent the corresponding support element, the stabiliser element being supported on the corresponding support element for vertical sliding movement thereon for adjusting a relative height therebetween.

A roller mount is preferably mounted on the frame structure for supporting the roller thereon, the roller mount being slidable in relation to the frame structure in a vertical direction for adjusting a relative height therebetween.

The frame structure preferably includes a plurality of ground penetrating uprights arranged to be penetrated into the ground, each upright including a portion of increased dimension adjacent a top end thereof for receiving hammer blows thereon to assist in penetrating the corresponding upright into the ground.

The roller and the main sheet are preferably arranged to be selectively separable from the frame structure.

The frame structure may be formed of collapsible elements.

BRIEF DESCRIPTION OF THE DRAWINGS

In the accompanying drawings, which illustrate exemplary embodiments of the present invention.

DETAILED DESCRIPTION

Figure 1:
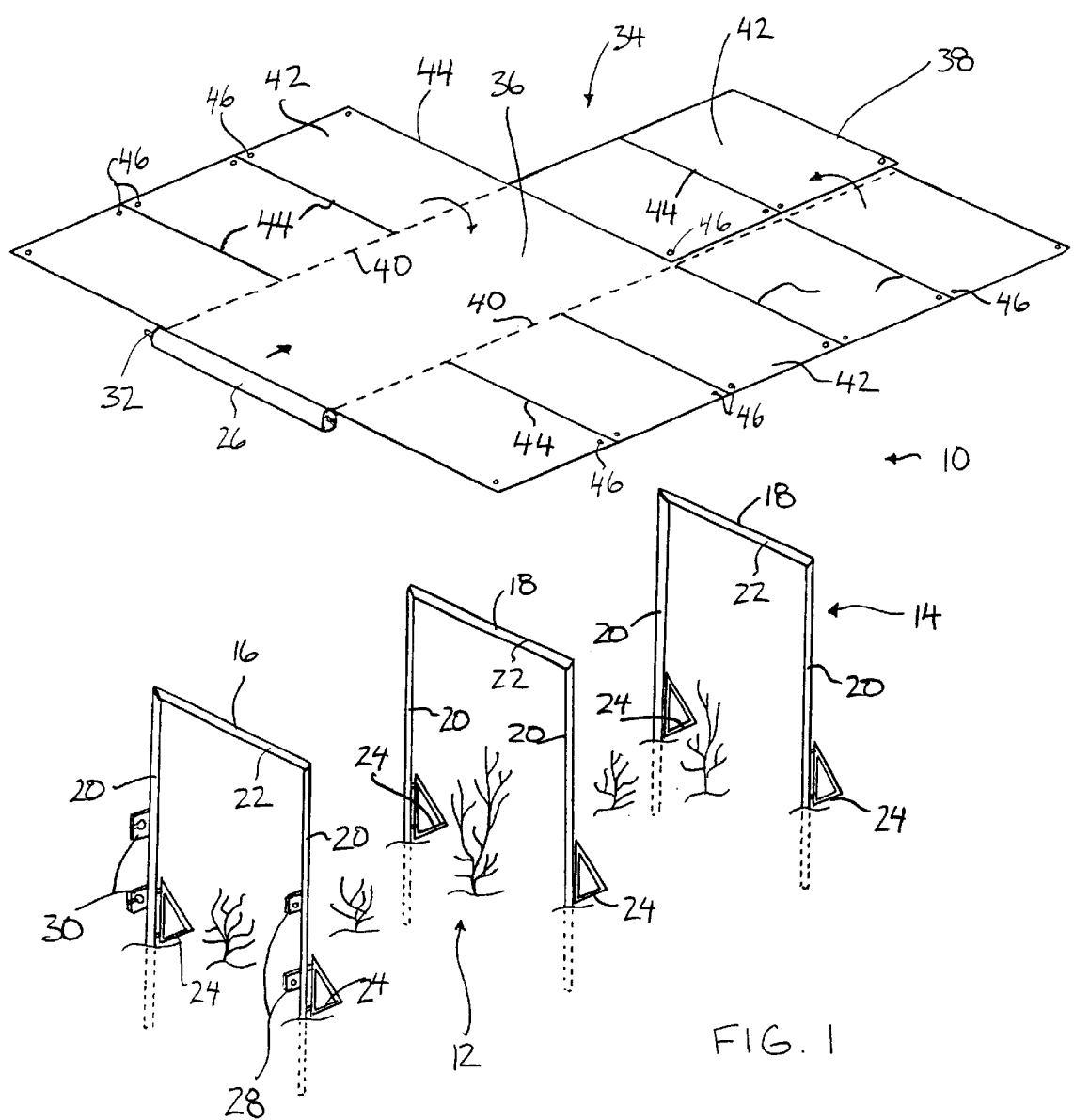
FIG. 1 is an isometric view of a first embodiment of the kit illustrating the frame structure and the sheet of material which has been unrolled for mounting over the frame structure.

Referring to the accompanying drawings, there is illustrated a garden enclosure kit generally indicated by reference numeral 10. The garden enclosure kit is arranged to provide an enclosure over a planted area such as a small garden 12 and the like to protect the planted area from frost and weather conditions including excessive rain or hail and the like.

Figure 2:
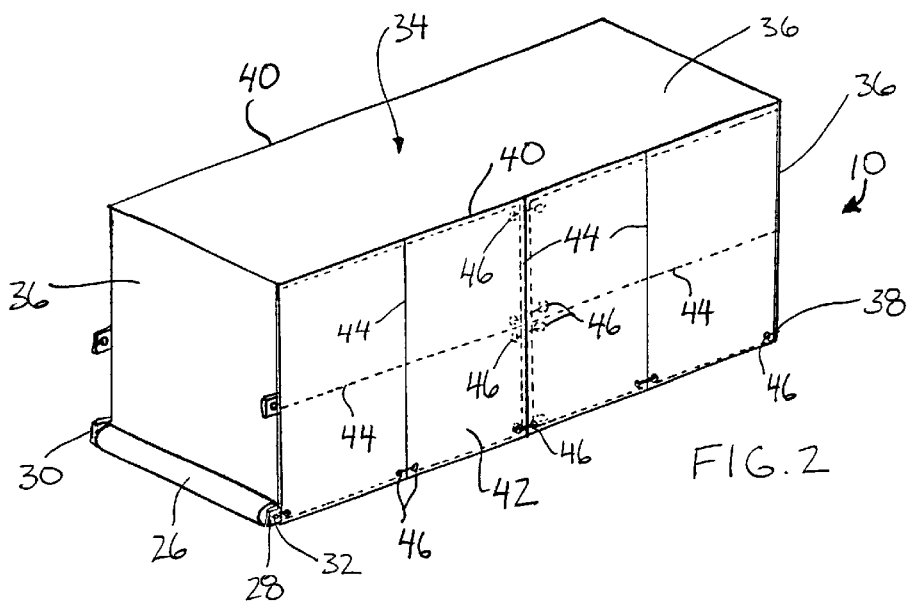
FIG. 2 is an isometric view of the sheet of material of FIG. 1 shown mounted on the frame structure to define an enclosure about a planted area.

A first embodiment of the kit 10 is illustrated in FIGS. 1 and 2 wherein there is provided a frame structure generally indicated by reference numeral 14. The frame structure 14 includes a roller support element 16 and a plurality of sheet support elements 18.

Each support element 16 and 18 is generally U-shaped having a pair of ground penetrating uprights 20 and a cross member 22 extending between the uprights 20 at one end thereof to secure the respective uprights at a fixed lateral spacing therebetween.

A stabilizer bar 24 is arranged to extend radially outward from each ground penetrating upright 20 for resting on a top side of the ground to provide additional support to the support elements 16 and 18. Each stabilizer bar 24 is mounted for vertical sliding movement by respective mounts slidably received within a longitudinally extending channel in each ground penetrating upright 20.

The roller support element 16 includes two pairs of roller mounts thereon at vertically spaced apart locations for selectively mounting a roller housing 26 on the roller support element at different relative heights. Each pair of roller mounts includes a first plate 28 having a mounting aperture therein and a second plate 30 having a slotted mounting aperture therein.

The support elements 16 and 18 are supported in the ground about a planted area in alignment with one another at spaced positions along the ground. A support element at one end of the planted area comprises a roller support element 16 while the remaining support elements comprise sheet supporting elements 18. The height of the resulting frame structure is adjustable by selecting which of the pairs of roller mounts are to be used and by penetrating the ground penetrating uprights 20 into the ground an appropriate amount.

The roller housing 26 mounts a roller 32 therein for rotation about a longitudinal axis of the roller. A slot in the side of the roller housing 26 is arranged to receive a sheeted material 34 therethrough similarly to a conventional roller blind. Also as in a conventional roller blind, the roller 32 is biased for rotation in one direction for rolling the sheeted material 34 onto the roller and into the roller housing.

The sheeted material 34 includes an elongate main sheet 36 which extends longitudinally from a coupled end secured on the roller 32 to a free end 38 which is arranged to be secured to the frame structure in an extended position of the main sheet on the last sheet supporting element 18 spaced farthest from the roller support element 16 supporting the roller housing thereon. The last support element 18 includes a set of mounting hooks for securing the free end of the main sheet 36 thereon. The main sheet 36 spans laterally between respective sides 40 thereof a distance approximately equal to a width of the roller 32.

A pair of side sheets 42 are formed continuously with the main sheet 36 and are arranged to extend laterally outward from the respective sides 40 thereof. Each side sheet 42 is pliable between a folded position wherein the side sheets extend laterally inwardly from respective sides of the main sheet parallel and adjacent to the main sheet one atop the other and the extended position wherein the side sheets 42 are arranged to hang freely from respective sides of the main sheet 36.

The side sheets 42 are arranged to extend laterally outwardly from the respective sides of the main sheet a distance approximately equal to the width of the main sheet so as to be received on the roller in a stored position with the main sheet.

Each side sheet 42 includes a plurality of slots 44 therein. The slots 44 extend laterally outwardly from the respective sides of the main sheet at longitudinally spaced locations therealong so as to permit the side sheets 42 to be unfolded in stages and at varying lengths. Mounting apertures 46 are located in the corners of the free ends of each flap defined between a pair of respective slots 44 in the side sheets 42. The mounting apertures 46 permit the side sheets 42 to be secured together and to the frame structure 14 to ensure the sheeted material 34 remains secured in the extended position so as to fully enclose the planted area.

Figure 3:
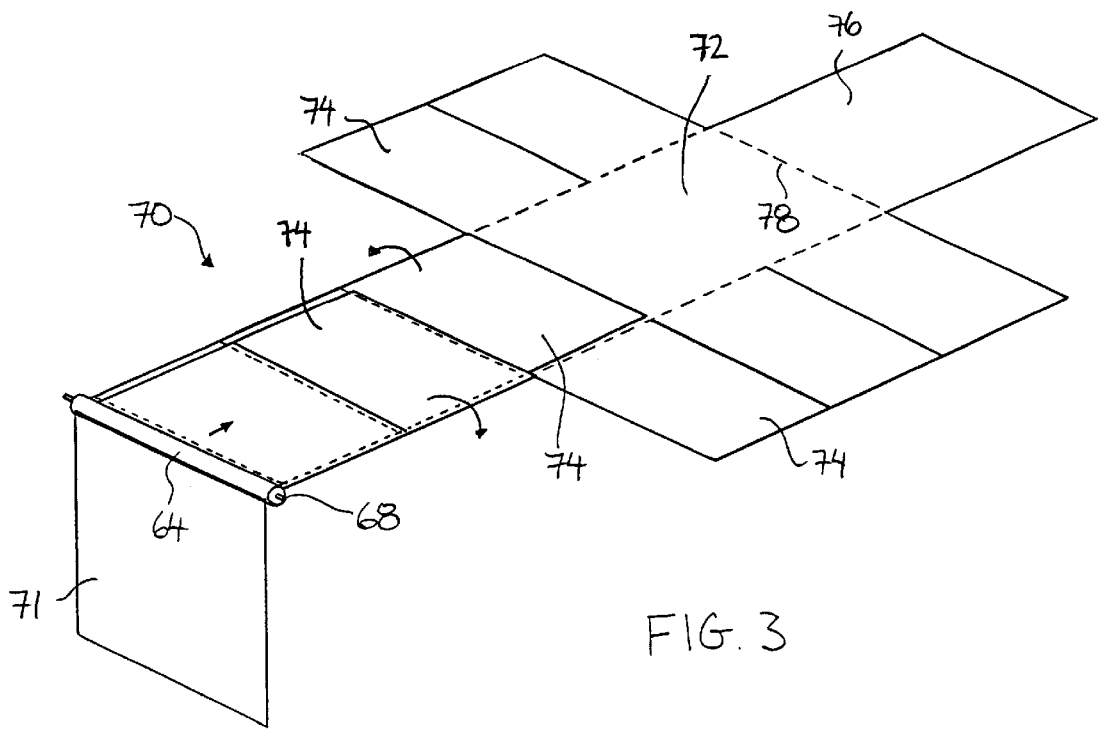
FIG. 3 is an isometric view of the sheet of material of a second embodiment of the garden enclosure kit.
Figure 4:
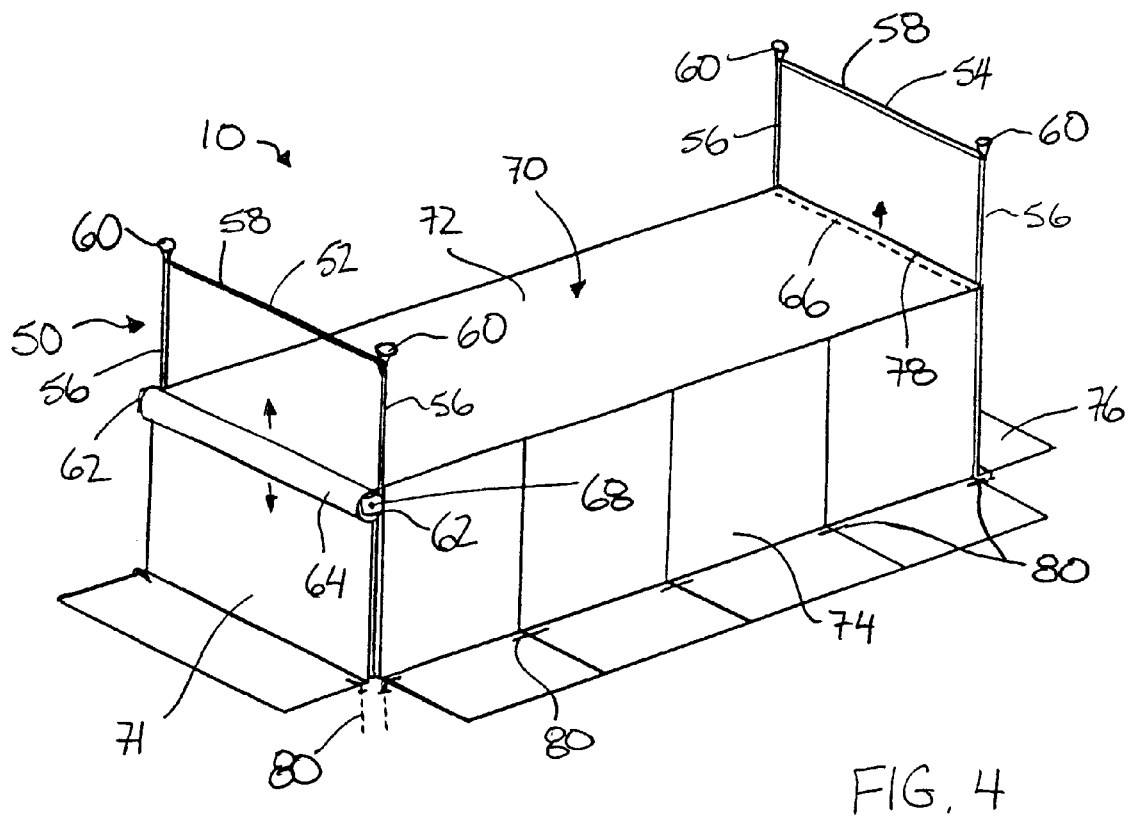
FIG. 4 is an isometric view of the sheet of material of FIG. 3 shown mounted on the frame structure of the second embodiment.

A second embodiment of the kit 10 is illustrated in FIGS. 3 and 4 wherein there is provided a frame structure generally indicated by reference numeral 50. The frame structure 50 includes a roller support element 52 and a plurality of sheet support elements 54 similarly to the previous embodiment. Each support element includes a pair of ground penetrating uprights 56 and a cross bar 58 coupled therebetween. Each upright 56 includes a portion of increased dimension 60 at a top end thereof so as to provide an enlarged flattened surface for receiving hammer blows and the like to penetrate the uprights 56 into the ground.

The roller support element 52 includes a pair of roller mounts 62 similarly to the previous embodiment for supporting a roller housing 64 therein. The roller mounts 62 are slidably mounted on the respective uprights 56 of the roller support element for vertical sliding movement in respective vertical tracks. Set screws are provided for securing the roller mounts at a selected relative height. The sheet support elements 54 each include a support bar 56 slidably mounted between the respective uprights 56 thereof so as to permit a relative height of the support bar 66 to be adjusted in co-operation with the roller mounts 62.

The roller housing 64 includes a roller 68 rotatably mounted therein for rolling a sheeted material 70 thereon similarly to the previous embodiment. An extension sheet 71 is coupled to the roller housing 64 to be suspended therefrom in an extended position of the sheeted material 70 when the roller housing is supported at a top end of the enclosure to be formed as illustrated in FIG. 4.

The sheeted material 70 includes an elongate main sheet 72 and a pair of slotted side sheets 74 extending from respective sides thereof similarly to the previous embodiment. The main sheet 72 of the second embodiment however includes an extension sheet 76 extending longitudinally outward from a free end 78 of the main sheet. The extension sheet 76 is approximately equal in length to a length of the side sheets 74 and the extension sheet 71 coupled to the roller housing 64.

A plurality of ground penetrating spikes 80 are provided for securing the free ends of the extension sheets and the side sheets to the ground in the extended position of the sheeted material. Each spike 80 includes a ground penetrating end and a retainer end opposite the ground penetrating end arranged to overlap the sheeted material on the ground. As shown in FIG. 4, the kit 10 is shown mounted in an intermediate vertical position such that the free ends of the side sheets and extension sheets overlap the ground while the spikes 80 may be mounted at any position therealong for securing the free ends to the ground.

Figure 5:
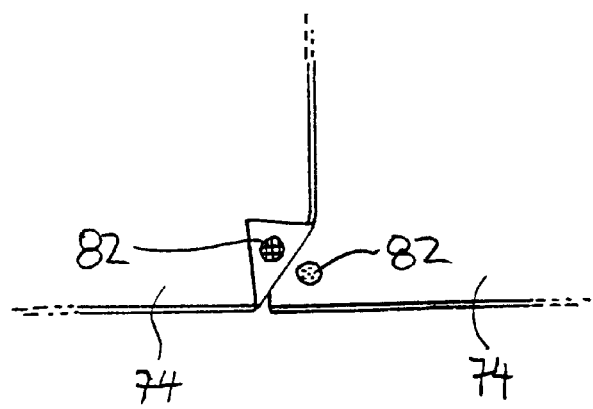
FIG. 5 is an isometric view of an alternate coupling arrangement for the side sheets of either embodiment of the sheet of material.

As illustrated in FIG. 5 an alternative arrangement for securing the free ends of the side sheets is provided. In this arrangement a pair of mating fasteners 82 such as Velcro™, buttons or clips are mounted on confronting corners on each side of each slot within the side sheets 74 for securing the corners together in an overlapping configuration as illustrated. Further fasteners similar to the fasteners 82 may be provided for securing the side sheets in either of the folded or extended positions.

In use an individual first sets up the frame structure 14 adjacent a planted area such as a garden 12 by penetrating the supporting elements 16 and 18 into the ground. The spacing of the supporting elements 16 and 18 is adjusted to span the entire garden 12 with plural intermediate sheet support elements 18 being used as required to support the sheeted material thereon. A relative height of the frame structure is adjusted as the support elements are penetrated into the ground.

Once the frame structure has been mounted the roller housing is supported on the roller support element of the frame structure so as to be selectively separable therefrom. The sheeted material may subsequently be unrolled from the roller housing the required length to span the entire frame structure 14 in an extended position of the material. Once the main sheet has been secured, the side sheets may be unfolded therefrom into the extended position suspended from respective sides of the main sheet so as to form an enclosure. The side sheets are secured by straps or fasteners to ensure the sheeted material remains in a fully enclosed position about the planted area.

In order to store the sheeted material, the straps and fasteners are released from the side sheets so as to permit the side sheets to be folded back into the folded position in which they may be secured. Once in the folded position the sheeted material may be rolled onto the roller and back into the roller housing. The roller housing may then be removed from the frame structure and stored as desired. The frame structure may remain planted in the ground as desired for further use.

The frame structure is preferably formed of rigid metallic members such as hollow tubing and the like. The members which form the support elements may be foldable relative to one another into a storage position using pivotal connections or may further be collapsible in construction using telescoping members.

Figure 6:
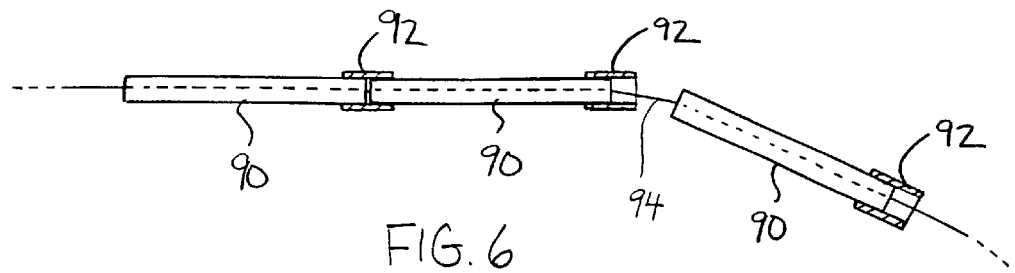
FIG. 6 is a partly sectional side elevational view of a portion of an alternative frame element which is collapsible.

As illustrated in FIG. 6, one of the members which forms the support members of the frame structure may be collapsible using interconnecting posts 90. Each post 90 is a tubular carbon fibre element similar to those used in conventional tent poles. A sleeve 92 is mounted about one end of each post 90 for receiving the end of an adjacent post therein in an assembled position. An elastic member 94 extends through the posts 90 for interconnecting adjacent posts and securing them in the assembled position. Stretching the elastic member permits the posts 90 to be released from the respective sleeves 92 of adjacent posts to collapse the members by folding the posts 90 adjacent to each other in a stored position. When supporting the sheeted material thereon, guide wires can be mounted between the support members and the ground to provide additional support as required.

The sheeted material is preferably a pliable yet durable material. This can include a weather resistant, substantially waterproof canvas or a thick opaque plastic and the like.

Figure 7:
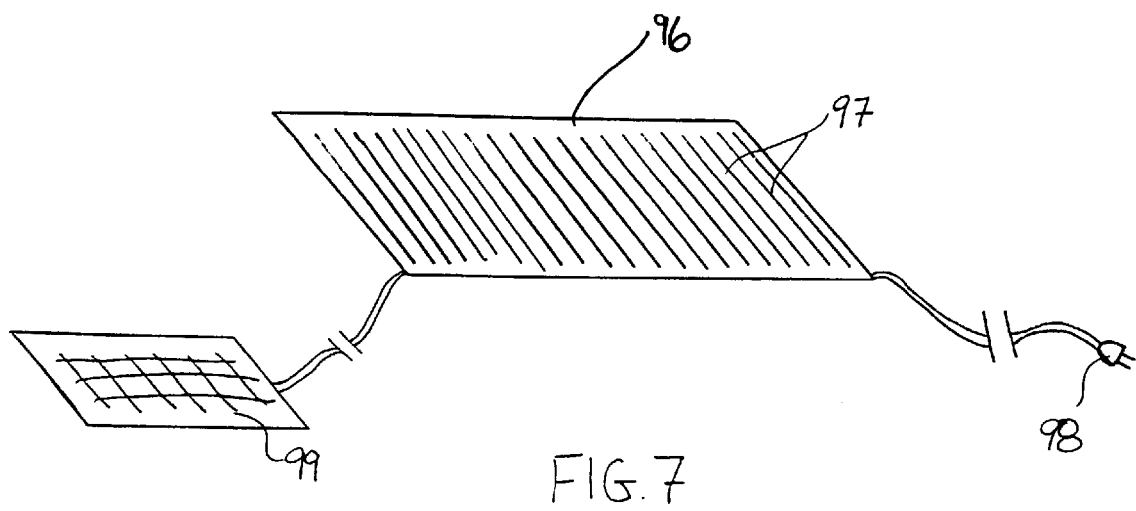
FIG. 7 is an isometric view of an alternative sheet of material having heating wires embedded therein.

As illustrated in FIG. 7, an alternative sheeted material 96 is provided having conductive heating wires 97 embedded therein. A current is arranged to be passed through the heating wires 97 in use for providing additional ambient heat for protection against frost as required. A thermostat may be provided in combination with the heating wires 97 for activating the heating wires only as required. The wires 97 may be supplied with power from an electrical plug 98 for use with a conventional electrical socket. Alternatively, a solar powered grid 99 may be provided for supplying the desired current to the heating wires 97. A battery would be required when using the solar powered grid, to continue providing power during the evening and in the absence of sufficient sunlight.

Figure 8:
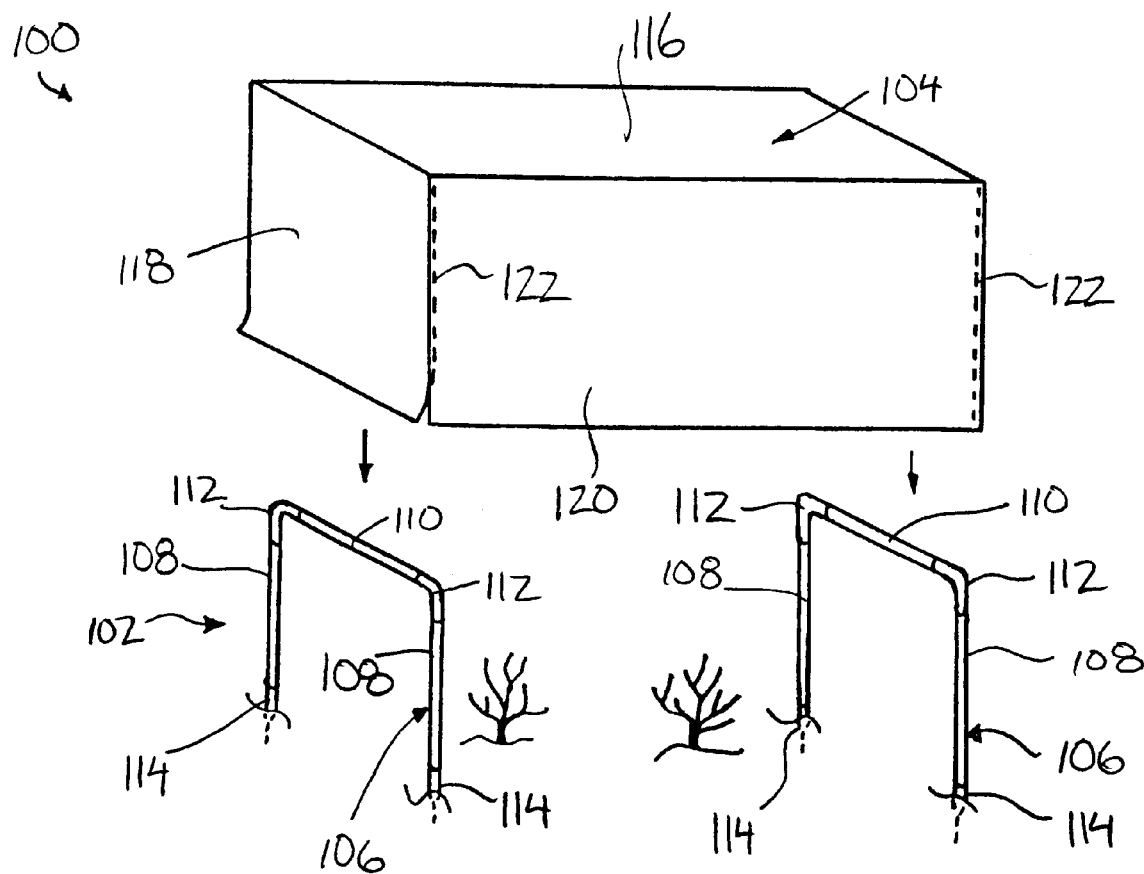
FIG. 8 is an isometric view of an alternative embodiment of the enclosure.

Referring now to FIG. 8 in the accompanying drawings, there is illustrated a further embodiment of the garden enclosure kit generally indicated by reference numeral 100. The embodiment of FIG. 8 forms a garden enclosure of fixed length and width which includes a frame structure 102 for supporting sheeted material 104 thereon similarly to the previous embodiments.

The frame structure 102 includes two or more frame elements 106 formed of PVC piping. Each frame element 106 includes two uprights 108 which are connected at a fixed spacing parallel to one another at respective top ends thereof by a cross bar 110 connected to the uprights by suitable PVC corners 112. A penetrating end 114 is mounted to the bottom end of each upright 108 which is arranged to assist penetration of the uprights into the ground. Each end 114 tapers towards a free end thereof so as to be reduced in cross section at a point of insertion into the ground.

The sheeted material 104 includes a top sheet 116 which is arranged to span across the top ends of the frame elements 106 supported on the ground. The sheeted material has a pre-selected width and length so that the frame elements 106 are penetrated into the ground at a pre-selected spacing from each other which corresponds to the length of the top sheet while the width of each frame element 106 as determined by the length of the cross bar 110 thereof corresponds to the pre-selected width of the top sheet 116.

The sheeted material also includes a pair of end flaps 118 which are connected along the edges of both ends of the top sheet 116. A pair of side flaps 120 are connected along respective side edges of the top sheet 116 similarly to the end flaps 118. Both sets of flaps 118 and 120 are similar in length, being at least as long and preferably longer than the uprights 108 of the frame elements 106. The flaps are arranged to be suspended from the top sheet 116 in use while being formed integrally with the top sheet 116 so as to form a sealed enclosure when the flaps hang from the sides and ends of the top sheet. Each side flap 120 is connected along respective side edges thereof to the side edges of the respective adjacent end flaps 118 so that when in use the flaps are connected at respective corner seams of the rectangular box-like structure with an open bottom side which is formed by the sheeted material supported on the frame structure. The corner seams between adjacent flaps are connected by selective connectors 122 which allow separation of the flaps from one another as desired. The connectors may comprise a zipper or other suitable fasteners such as Velcro or tie straps received through cooperating apertures. When using a zipper, the zipper is preferably oriented to open each corner seam from a bottom end to a top end for connecting the flaps from the top end only part way down if desired.

In use the frame elements are assembled using the PVC components described above and are inserted into the ground using the respective ends 114 of the elements. In longer embodiments a third frame element 106 may be provided intermediate between the frame elements at respective ends of the enclosure to be formed. When different heights are required, the frame elements may either be penetrated into the ground at different heights or different lengths of PVC piping may be provided for the uprights 108 to substitute appropriate length uprights in each frame element 106 according to a desired final height of the enclosure.

The sheeted material is then suspended over the frame structure with the top sheet spanning between respective frame elements at each end of the enclosure to be formed. With the flaps hanging from the top sheet at respective sides and ends of the enclosure when shorter PVC pipes are used for the uprights 108 in shorter applications, the ends of the flaps are permitted to overlap on the ground similarly to the embodiment illustrated in FIG. 4 which is also shown for a shorter application. The flaps are then connected to one another from a top end thereof only part way down to a point where the flaps engage the ground so as to fully enclose the area surrounded by the top sheet and the flaps.

When sold as a kit, the frame elements 106 are preferably provided with sets of different length uprights 108 for use when different height requirements are to be met. Furthermore one or more different length covers of sheeted material may be provided for use with the frame elements so that an individual may select an appropriate length of uprights for the frame elements depending on height requirements, and then select a cover of sheeted material having an appropriate length to fully enclose a desired area to be protected by the garden enclosure kit 10. Once a cover of sheeted material of a pre-selected length is chosen the frame elements are inserted into the ground at the pre-selected spacing which corresponds to the pre-selected length of the sheeted material. When assembling the garden enclosure kit 100, the final step includes connecting the flaps to one another from a top end to the point where the flaps engage the ground as described above.

While various embodiments of the present invention have been described in the foregoing, it is to be understood that other embodiments are possible within the scope of the invention. The invention is to be considered limited solely by the scope of the appended claims.

What is claimed is:

1. A garden enclosure kit for protecting a planted area from a surrounding climate, the kit comprising:

a frame structure arranged to be supported on the ground adjacent the planted area;

a roller arranged to be selectively coupled to the frame structure for rotation about an axis of the roller;

an elongate main sheet extending in a longitudinal direction of the main sheet from a coupled end to a free end of the main sheet;

the coupled end of the main sheet being coupled to the roller for rolling the main sheet onto the roller in a stored position;

the free end of the main sheet being arranged to be selectively coupled to the frame structure at a location spaced from the roller in an extended position for defining a cover extending over the planted area between the roller and the free end of the main sheet; and side sheets integrally formed with respective sides of the main sheet to extend laterally outward therefrom and being foldable relative to the main sheet between a folded position lying adjacent the main sheet and a suspended position suspended from the sides of the main sheet for defining an enclosure over the planted area in the extended position of the main sheet;

the side sheets each including a plurality of slots formed therein, extending laterally outward at longitudinally spaced positions therealong.

2. The garden enclosure kit according to claim 1 wherein the side sheets extend laterally outward a distance approximately equal to a width of the main sheet.

3. The garden enclosure kit according to claim 1 wherein the main sheet and the side sheets are formed of a pliable weather resistant material.

4. The garden enclosure kit according to claim 1 wherein the main sheet and the side sheets are formed of a substantially waterproof material.

5. The garden enclosure kit according to claim 1 wherein the roller includes a biasing mechanism for urging the main sheet into a rolled position about the roller.

6. The garden enclosure kit according to claim 1 wherein there is provided an extension sheet extending longitudinally outward from the free end of the main sheet beyond the side sheets a distance approximately equal to a length of the side sheets.

7. The garden enclosure kit according to claim 1 wherein there is provided a roller housing mounting the roller therein and an extension sheet mounted on the roller housing to extended outwardly therefrom a distance approximately equal to a length of the side sheets.

8. The garden enclosure kit according to claim 1 wherein there is provided a plurality of apertures in respective free ends of the side sheets for securing the side sheets adjacent the ground in the extended position.

9. The garden enclosure kit according to claim 1 wherein there is provided a plurality of ground penetrating stakes having respective retainer portions arranged to secure the respective side sheets adjacent the ground in the extended position.

10. The garden enclosure kit according to claim 1 wherein there is provided a plurality of fasteners secured to the respective free ends of the side sheets for securing the side sheets in the extended position.

11. The garden enclosure kit according to claim 1 wherein the frame structure is adjustable in height.

12. The garden enclosure kit according to claim 1 wherein the frame comprises a pair of spaced apart end support elements arranged to support the main sheet spanning there between.

13. The garden enclosure kit according to claim 12 wherein there is provided a plurality of intermediate support elements at spaced apart locations between the end support elements.

14. The garden enclosure kit according to claim 12 wherein each support element includes a stabiliser element coupled thereto for engaging the ground adjacent the corresponding support element, the stabiliser element being supported on the corresponding support element for vertical sliding movement thereon for adjusting a relative height therebetween.

15. The garden enclosure kit according to claim 1 wherein there is provided a roller mount mounted on the frame structure for supporting the roller thereon, the roller mount being slidable in relation to the frame structure in a vertical direction for adjusting a relative height therebetween.

16. The garden enclosure kit according to claim 1 wherein the frame structure includes a plurality of ground penetrating uprights arranged to be penetrated into the ground, each upright including a portion of increased dimension adjacent a top end thereof for receiving hammer blows thereon to assist in penetrating the corresponding upright into the ground.

17. The garden enclosure kit according to claim 1 wherein the roller and-the main sheet are arranged to be selectively separable from the frame structure.

18. The garden enclosure kit according to claim 1 wherein the frame structure is formed of collapsible elements.

* * * * *